Figure 1:
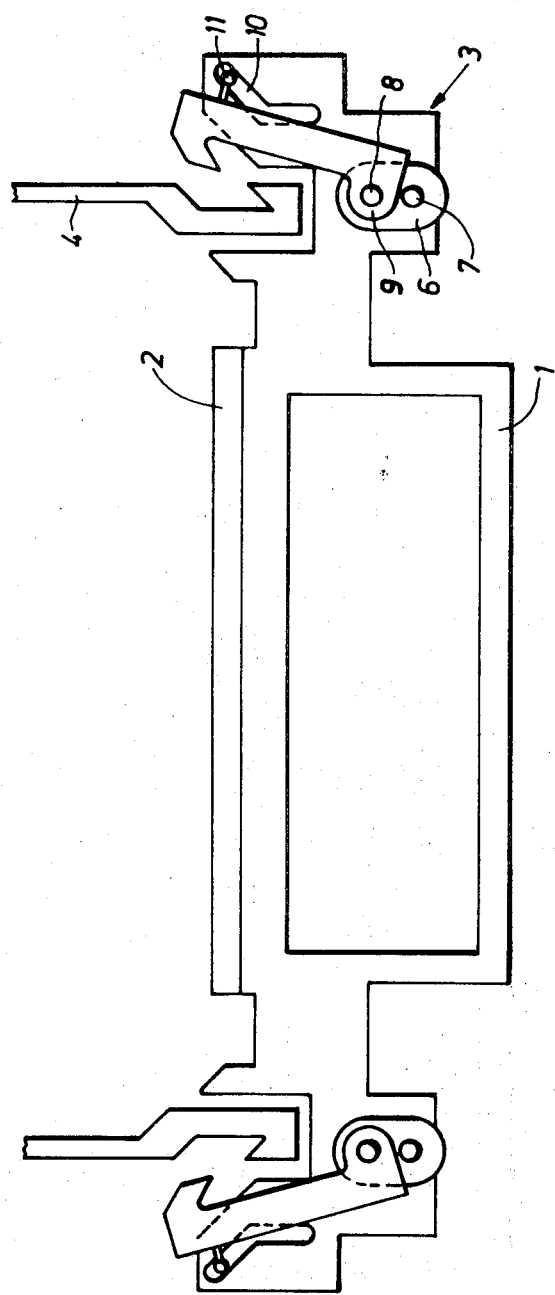

United States Patent [19]
Lippold

[11] 3,801,059
[45] Apr. 2, 1974

[54] MOULD FOR USE IN FILLING OF HOLLOW BODIES WITH FOAM AND FOR THE PRODUCTION OF HARD-FOAM ARTICLES

[75] Inventor: Herbert Lippold, Cologne, Germany

[73] Assignee: Maschinenfabrik Hennecke GmbH, Leverkusen, Germany

[22] Filed: June 15, 1972

[21] Appl. No.: 263,057

[30] Foreign Application Priority Data
June 22, 1971 Germany.................. P 21 30 801.0

[52] U.S. Cl.................... 249/134, 249/83, 249/139, 249/152, 249/162, 425/450
[51] Int. Cl............................................... B29c 1/16
[58] Field of Search........ 425/4 R, 394, 450, 817 R; 249/134, 152, 162, 83, 84, 139, 161, 162

[56] References Cited
UNITED STATES PATENTS

| | | | |
|---|---|---|---|
| 2,736,942 | 3/1956 | Dudley | 249/162 |
| 2,972,777 | 2/1961 | Ghignatti | 425/450 |
| 3,680,824 | 8/1972 | Kesting | 249/162 |
| 1,287,998 | 12/1918 | Hopkins | 249/162 |

FOREIGN PATENTS OR APPLICATIONS

| | | | |
|---|---|---|---|
| 1,406,090 | 6/1965 | France | 425/394 |

Primary Examiner—R. Spencer Annear
Assistant Examiner—Mark Rosenbaum
Attorney, Agent, or Firm—Burgess, Dinklage & Sprung

[57] ABSTRACT

For filling hollow bodies with foam and for the production of hard-foam articles a mould with removable walls is used, one mould wall being formed by a backing table wherein the removable mould walls are supported on a supporting platform by means of parallel guide elements.

11 Claims, 3 Drawing Figures

MOULD FOR USE IN FILLING OF HOLLOW BODIES WITH FOAM AND FOR THE PRODUCTION OF HARD-FOAM ARTICLES

This invention relates to a mould for use in filling hollow bodies with foam and for the production of hard-foam articles, the mould consisting of removable mould walls, one mould wall being formed by a backing table.

Moulds of the aforementioned kind are used in particular for the production of refrigerator cabinets, radio cabinets, furniture, etc. Pressed or deep-drawn plastics sheets which determine the outer and inner contour of the refrigerator cabinet, are placed on the backing table, the mould serving to support this preform during the foaming process. Refrigerator cabinets without cover sheets are similarly prepared by allowing the walls of the mould to come into direct contact with the developing foam. An integral hard foam with an impervious outer skin is formed.

In conventional moulds, the individual mould walls were mounted on hinges and have to be bolted together in a time-consuming operation. Another disadvantage is that, in conventional moulds, the refrigerator housing had to be filled with foam with its rear wall uppermost. As a result, the rear wall is occasionally not completely filled with foam because bubbles are formed. Another disadvantage is that, during mould release, the cabinet has to be raised upwards because in this case the backing table is shaped in accordance with the inner contour of the refrigerator cabinet. This operation is both extremely laborious and complicated.

Accordingly, the object of the present invention is to provide a mould for filling hollow bodies with foam and for the production of hard-foam articles, especially refrigerator cabinets, which ensures complete filling with foam and which, in addition, enables the mould-filling and mould-release operations to be carried out particularly quickly.

According to the invention, this object is achieved by virtue of the fact that the removable mould walls are held on a supporting platform by means of parallel guide elements.

Where necessary, the opposite edges of the mould walls are provided with corresponding bevels so that the mould walls do not impede one another during the mould-filling and mould-release operations. In this way, the mould walls can be automatically brought into the working position.

In one particular embodiment, the parallel guides consist of parallelogram guides. This embodiment is particularly favourable in cases where a vertically displaceable supporting platform is used because, in this case, the mould wall panels move under the effect of gravity and, when lowered, automatically move into their working position and support one another.

In an equivalent embodiment, the parallel guides consist of hydraulic pistons and cylinders. Providing the supporting platform is suitably designed and providing restoring elements in the form of springs or double-acting pistons are used, this embodiment is unaffected by gravity so that the supporting platform can be introduced into a preform, for example even from the side. In this case, the backing table may even be vertically arranged.

The length of the parallel guides is preferably adjustable to enable the supporting platform and, within certain limits, the mould walls, to be used for different kinds of articles which are to be filled with foam or to be produced.

In one particularly advantageous embodiment, locking elements corresponding to one another are arranged on the supporting platform and on the backing table. In this way, the entire mould is advantageously stabilised against the foaming pressure that acts on it.

The mould walls are preferably replaceable. This measure also contributes towards enabling the supporting platform to be used for filling with foam or for producing articles of different kinds.

In another particular embodiment, the mould walls consist of several individual sections with replaceable elements. The advantage of this is that, in the event of complex shapes, these individual sections can be removed from the composite structure beforehand to enable the remaining mould walls to move. However, this configuration is already known in the case of undercut or similar moulds.

The mould walls are preferably made of plywood. The plywood acts as a heat insulator. For heating, the mould walls are preferably covered with a heating foil. The advantage of a heating foil is that only a relatively small mass has to be heated and cooled.

One particular configuration of the mould according to the invention has proved to be of advantage for the production of a refrigerator housing or the like which rests on the backing table with its rear wall. In this embodiment, outer mould walls and inner mould walls are provided, a bottom mould panel suspended from vertical guides being associated with the inner mould walls.

The inner mould walls advantageously comprise along their upper edge stop elements which, in the working position, rest on the upper edge of the outer mould walls. In the production of hard foam articles, these stops can extend over the entire upper surface of the mould, hence closing the mould cavity at its upper end.

Figure 2:
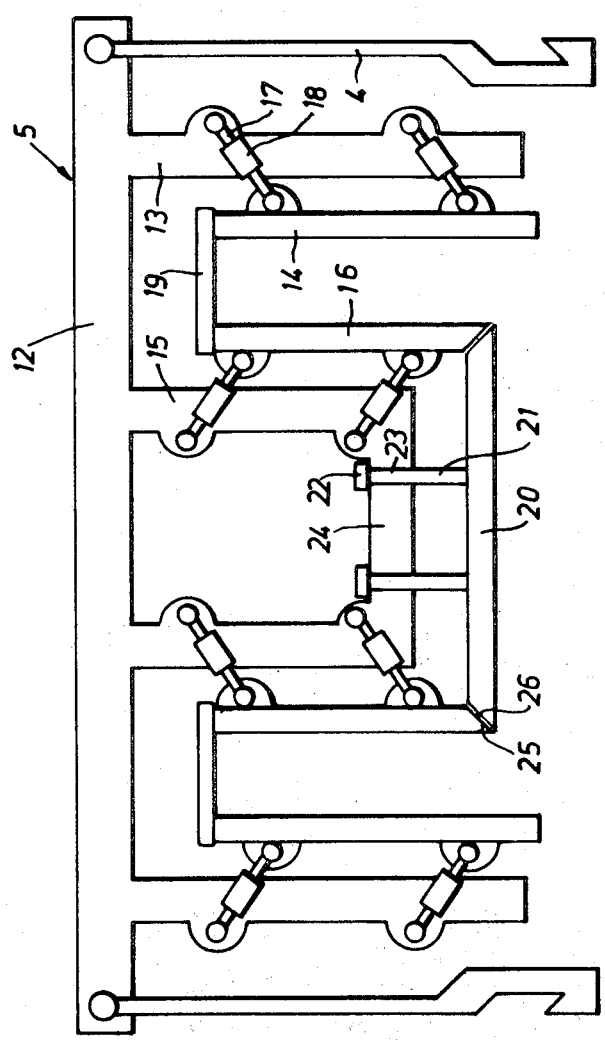
Figure 3:
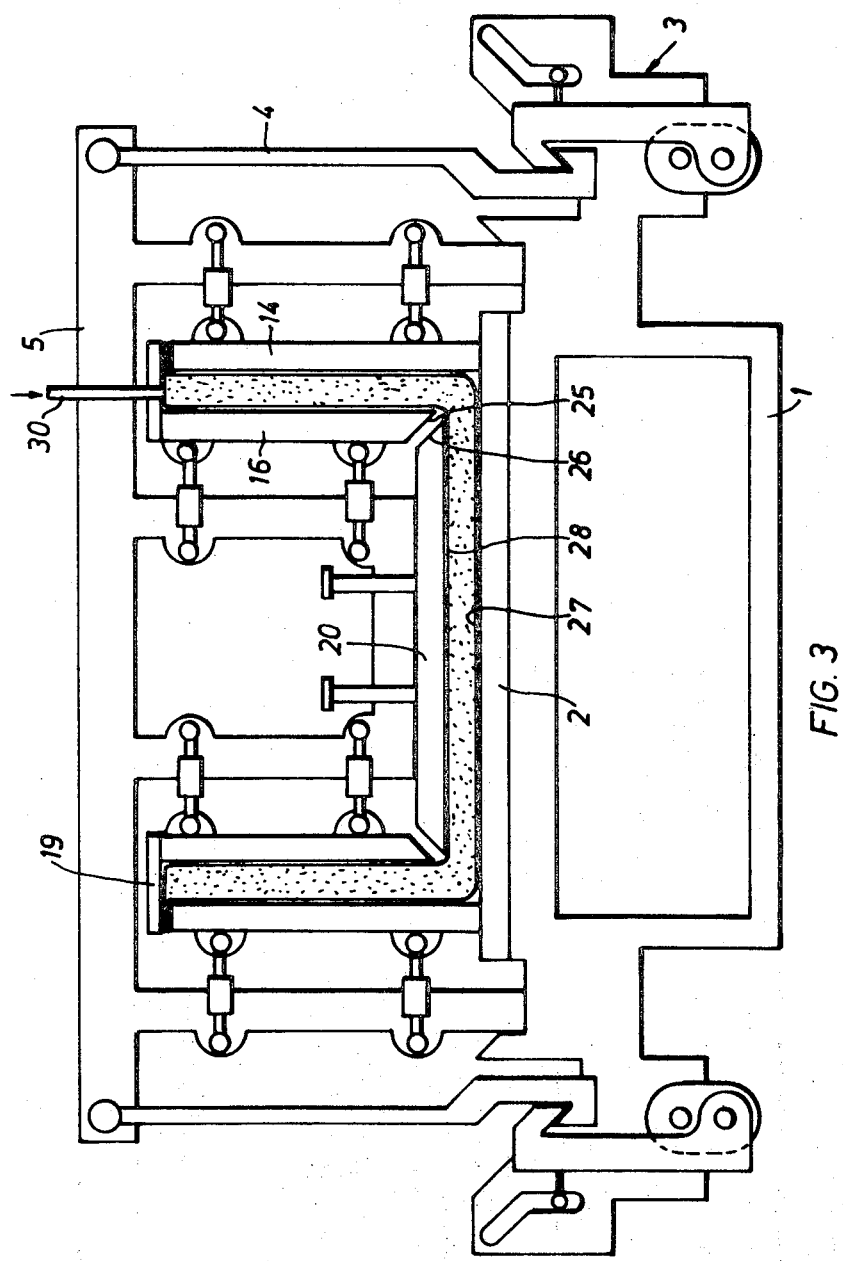

One embodiment of the mould according to the invention is described by way of example in the following and illustrated purely diagrammatically in the accompanying drawings, wherein:

FIG. 1 shows the backing table for the mould.
FIG. 2 shows the supporting platform for the mould.
FIG. 3 shows the mould in its working position.

The mould consists of a frame 1 with a backing table 2. Locking elements 3 engage locking elements 4 of a supporting platform 5 (FIG. 2). The locking elements 3 provided on the frame consist of crank webs 6 which are adapted to rotate about pins 7. Locking levers 9 are held on pins 8 in the crank webs 6. Their movements are controlled by guide slots 10 in which guide pins 11 are slidable.

The supporting platform 5 (FIG. 2) consists of a supporting panel 12 from which supporting arms 13 and 15 project downwards to support the outer mould walls 14 and the inner mould walls 16 respectively. The mould walls 14 and 16 are pivotally held on the supporting arms 13 and 15 by means of parallelogram guides 17. The length of the parallelogram guides 17 can be adjusted by means of adjusting nuts 18. Along their upper edge, the inner mould walls 16 carry stops 19 which during use of the mould are adapted to rest on the upper edge of the outer mould walls 14. A bottom mould panel 20 is supported by vertical guides 21 which stops 22 with are located in bores 23 formed in a bottom mould panel 24 extending between the supporting arms 15 the guides being retained by stops 22. Opposing edges 25 and 26 of the mould walls 16 and the bottom mould panel 20 respectively are bevelled towards one another so that the individual mould walls 16 and the bottom mould panel 20 do not impede one another during movement.

Closure of the mould will now be described, this operation terminating in the working position shown in FIG. 3.

After a preform consisting of an outer-contour sheet 27 and an inner-contour sheet 28 has been placed on the backing table 2, the supporting platform 5 is lowered downwards onto the frame 1, the mould walls 14 and 16 initially hanging downwards under the effect of gravity as far as permitted by the deflectability of the mould parallelogram guides 17. By virtue of its weight, the bottom mould panel 20 also hangs downwards. As lowering continues, the outer mould walls 14 come to rest on the backing table 2. The bottom mould panel 20 now bears against the inner sheet 28 of preform, which is for example a prefabricated refrigerator cabinet. The mould walls 16 lie with their edges 25 on the edges 26 of the bottom mould panel 20 until the stops 19 come into contact with the upper edge of the outer mould panel 14. At the same time, the edges 25 and 26 move somewhat apart from one another again. The mould is then closed by locking the locking elements 3 and 4 and foaming can take place through the feed opening 30.

After the foam has hardened, the mould is released by releasing the locking elements 3 and 4 and the supporting platform 5 removed upwards. The mould walls 14 and 16 detach themselves automatically from the refrigerator cabinet produced under the effect of gravity.

What we claim is:

1. A mould for use in filling hollow bodies with foam and for the production of hard-foam articles, the mould comprising removable mould walls, said walls including outer and inner mould walls and a bottom mould panel suspended from vertical guides, said bottom mould panel being adapted to contact said inner mould walls, said mould including one mould wall being formed by a backing table, wherein the removable mould walls are supported on a supporting platform by means of parallel guide elements.

2. A mould according to claim 1, wherein the parallel guide elements comprise parallelogram guides.

3. A mould according to claim 1, wherein the parallel guide elements comprise hydraulic pistons and cylinders.

4. A mould according to claim 1, wherein the length of the parallel guide element is adjustable.

5. A mould according to claim 1, wherein locking elements which are adapted to lock together are arranged on the supporting platform and the backing table.

6. A mould according to claim 5, wherein the mould walls are replaceable.

7. A mould according to claim 5, wherein the mould walls consist of several individual sections with replaceable elements.

8. A mould according to claim 1, wherein the mould walls are made up of plywood.

9. A mould according to claim 1, wherein the inner mould walls are provided along their upper edge with stop elements which are adapted during use of the mould to rest on the upper edge of the outer mould walls.

10. A mould for use in filling a hollow housing of preformed sheet material with foam, especially a refrigerator housing, and the production of hard-foam housings, said mould comprising removable outer and inner mould walls defining a mould cavity together with a bottom mould panel and a backing table, said bottom mould panel suspended from vertical guides supported by a supporting platform by means of bores, one of the walls of said mould being formed by a backing table arranged facing the supporting platform and adapted to support a moulded article with its rear wall thereon, said bottom mould panel being vertically displaceable in the direction of the packing table and adapted to contact the inner mould walls, said supporting platform and backing table having coacting clamping means.

11. A mould according to claim 10 wherein the inner mould walls are provided along their upper edge with stop elements which are adapted during the use of the mould to rest on the upper edge of the outer mould walls.

* * * * *